United States Patent
Allwörden et al.

(10) Patent No.: US 6,813,873 B2
(45) Date of Patent: Nov. 9, 2004

(54) GROUND-SURFACE ADAPTION DEVICE FOR ATTACHMENTS ON HARVESTING MACHINES

(75) Inventors: Wilhelm von Allwörden, Dresden (DE); Ingo Mende, Dresden (DE); Henri Scholtke, Obergurig (DE); Peter Spaida, deceased, late of Oppach (DE); by Gisela Spaida, legal representative, Oppach (DE); Gerhard Windisch, Bischofswerda (DE)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/220,968

(22) PCT Filed: Feb. 28, 2001

(86) PCT No.: PCT/DE01/00784
§ 371 (c)(1),
(2), (4) Date: Dec. 18, 2002

(87) PCT Pub. No.: WO01/65917
PCT Pub. Date: Sep. 13, 2001

(65) Prior Publication Data
US 2004/0040276 A1 Mar. 4, 2004

(30) Foreign Application Priority Data
Mar. 9, 2000 (DE) .......................................... 100 11 498

(51) Int. Cl.⁷ .......................... A01D 34/86; A01D 75/28
(52) U.S. Cl. ...................................... 56/10.2 E; 56/208
(58) Field of Search .......................... 56/10.2 R, 10.2 A, 56/10.2 D, 10.2 E, 10.2 F, 15.1, 208, 209, 210, DIG. 15; 172/2, 4.5

(56) References Cited

U.S. PATENT DOCUMENTS 4,312,177 A * 1/1982 Maier et al. ................... 56/208
4,641,490 A * 2/1987 Wynn et al. .............. 56/10.2 E
4,776,153 A * 10/1988 DePauw et al. ......... 56/10.2 E
5,155,984 A * 10/1992 Sheehan ................... 56/10.2 E
5,473,870 A   12/1995 Panoushek

FOREIGN PATENT DOCUMENTS

| BE | 773 297 | 1/1972 |
|----|---------|--------|
| DE | 17 57 007 | 11/1971 |
| DE | 196 01 420 | 7/1997 |
| EP | WO 81/01938 | * 7/1981 |
| EP | 0 198 544 | 10/1986 |
| EP | 0 331 893 | 9/1989 |
| EP | 0 511 768 | 11/1992 |
| EP | 0 748 153 | 12/1996 |
| EP | 0 765 594 | 4/1997 |
| EP | 0 936 475 | 8/1999 |
| WO | WO 81 01938 | 7/1981 |

* cited by examiner

Primary Examiner—Robert E. Pezzuto
(74) Attorney, Agent, or Firm—Rebecca Henkel; Brant T. Maurer

(57) ABSTRACT

A crop harvesting machine is provided having a crop feeder device that is movable through various heights via manipulation of first hydraulic cylinders. A crop gathering attachment is mounted onto a front side of the crop feeder device. A crop gathering attachment is provided having fixed height sensors that measure a distance of the attachment above the ground. A second hydraulic cylinder is provided between the crop feeder device and the crop gathering attachment to control the angle of tilt of the crop gathering attachment relative to the crop feeder device. The angle of tilt is measured by a tilt sensor. A controller is connected to the sensors and provides output to the cylinders to control the machine height and angle of tilt.

16 Claims, 3 Drawing Sheets

GROUND-SURFACE ADAPTION DEVICE FOR ATTACHMENTS ON HARVESTING MACHINES

BACKGROUND OF THE INVENTION

The invention concerns a device for ground copying for front attachments to harvesting machines, especially for self-propelled combine harvesters and forage choppers, in accordance with the features in the generic terms of claim 1.

Such devices for ground copying serve to adjust the front attachments to the unevenness of the ground, so that the crop can be harvested without loss even under these conditions. For this it is adequately known to fix the attachments to the harvesting machine so that they can swivel, so that on the one hand the so-called longitudinal movement of copying can be executed along the axis transverse to the direction of travel of the machine and on the other hand transverse copying can be effected along an axis pointing in the direction of travel. The cases for the application of such devices for ground copying extend to cutting and mowing machines of all types of construction and to gathering devices on the most varied types of harvesting machines. Therefore they have become so important, as all these attachments must have an appropriately wide working width because of the very high productive capacity of the present-day harvesting machines. In the state of the art a multitude of variant embodiments for this have already become known, which can be divided into two large categories.

The first category is described in EP 0 331 893 B1, in which the attachment is fixed on the front side of the harvesting machine so that it can tilt for the purpose of copying longitudinally and transversely. Two hydraulic cylinders arranged at a distance from each other and symmetrically about the central longitudinal axis of the harvesting machine support the attachment from below with a force such that is presses on the ground only with a residual weight and consequently with a slight pressure, in order to be able to follow the irregularities of the ground via skates, running wheels or its ground trough itself for longitudinal copying. For keeping to a set value for the ground pressure either by means of suitable sensors, the pressure in the hydraulic cylinders or the supporting force of the hydraulic cylinders on the chassis of the harvesting machine is monitored. In the event of a deviation from this set value the piston rods of the hydraulic cylinders are driven so far in or out until the set value again prevails, which is associated with a raising or lowering of the attachment. For transverse copying the attachment is equipped in its outer side regions with sprung elastic slide hoops, which detect the ground and via a potentiometer connected to them furnish a measure of the distance of the attachment from the ground. If the signals from both sides differ from each other, two further hydraulic cylinders have pressure applied to them, which are applied in a vertical direction between for example the feeder shaft of the combine harvester and the attachment, which tilt the attachment laterally until on both sides of the attachment the same distance is restored again.

Such devices for ground copying serve to adjust the front attachments to the unevenness of the ground, so that the crop can be harvested without loss even under these conditions. For this it is adequately known to fix the attachments to the harvesting machine so that they can swivel, so that on the one hand the so-called longitudinal movement of copying can be executed along the axis transverse to the direction of travel of the machine and on the other hand transverse copying can be effected along an axis pointing in the direction of travel. The cases for the application of such devices for ground copying extend to cutting and mowing machines of all types of construction and to gathering devices on the most varied types of harvesting machines. Therefore they have become so important, as all these attachments must have an appropriately wide working width because of the very high productive capacity of the present-day harvesting machines. In the state of the art a multitude of variant embodiments for this have already become known, which can be divided into two large categories.

As regards this device for ground copying, it can be criticized on the one hand since because of the constantly flowing hydraulic oil it reacts to a considerable degree much too sluggishly. On the other hand it delivers the control signal for longitudinal copying much too late. Furthermore there is a disadvantage that through ground detection under different weather conditions, through constantly changing leverage ratios and hysteresis phenomena in the lifting system and through the influence of markedly fluctuating dynamic forces, practically no reproducible set values for ground pressure can be realized. The consequence of this is that obstacles cannot be avoided and its operability is put into question even at moderate driving speeds.

The second category of devices for ground copying, one embodiment of which is described in EP 0 748 153 B1, works alongside the facility proposed in the first category via direct ground contact of the attachment now principally without this. For this, ultrasound sensors are fixed on both sides in the region of its sidewalls, which continuously measure the distance of the attachment from the ground and produce a corresponding output signal. In the driver's cab of this harvester a control device is installed, which receives the output signals from the ultrasound sensors and in the event of a deviation from a prescribed set value for the distance it addresses a control valve in the hydraulic circuit of the hydraulic cylinder for raising and lowering the attachment. Since the hydraulic cylinder is arranged analogously to the solution described in the foregoing and is actuated likewise, this system operates just as sluggishly and imprecisely as regards adherence to the set value for the distance between the attachment and the ground. The ultrasound sensors present an additional disturbing factor, as they cannot distinguish between plants or stubble lying on the ground and the ground itself, so that under these conditions they deliver false distances. Because of their arrangement just above the ground, these errors are made especially noticeable. Furthermore, ultrasound sensors react to wind and humidity with a large scattering of the measured values. In addition they are relatively expensive to purchase, so that all these disadvantages taken together could be the reason that such a device for ground copying has not been accepted in practice.

Setting out from the negative experiences from the aforedescribed solution, a further device for ground copying has been published in EP 0 511 768 B1 and EP 0 936 475 A1, where the ultrasound sensors employed there are fixed far above the ground and in the side region of the attachments. With this it is achieved that only the measurement error for distance caused by stubble or plants lying on the ground is diminished somewhat as a percentage.

A further possibility for a device for ground copying be means of ultrasound sensors is described in EP 0 765 594 A1 with an example of a combine harvester cutter. There the ultrasound sensors measure continuously the distance to the sensor skids attached to the exterior of the cutter with the aid of a plate attached to them, in order to exclude the error from ground sensing. However this measure alone is not sufficient for well-functioning ground copying. Furthermore, the angle of incidence and emission to the plate varies constantly, so that distortions to the measurement of distance occur.

To be assessed analogously is the ground copying in accordance with DE 196 01 420 A1, where a prestressed sliding element of narrow spring steel senses the ground and transmits its movement in consequence of ground irregularities to a signal transmission element. This is formed as a parallelogram of rods, to which a plate is attached, which in contrast to the previously described plate on the sensor skid executes approximately parallel movements. This is irradiated by a wave sensor and reflects its radiation. From this the wave sensor determines a measure for the change in position of the sliding element, which is in a directly proportional ratio to the distance of the attachment from the ground. The measure thus determined with a somewhat greater accuracy, is however used finally also only for driving a control valve in the hydraulic circuit for the hydraulic cylinder for raising and lowering the front attachment, so that all the previously mentioned disadvantages cannot be removed even with this ground copying. An additional deficiency is caused be the narrow sliding elements in the presence of longitudinal grooves in the ground, as they then indicate a false distance.

BRIEF SUMMARY OF THE INVENTION

Therefore the objective of the invention is to create a device for ground copying for front attachments to harvesting machines, which reacts rapidly to irregularities in the ground, even at higher driving speeds, which adheres with greater precision to the distance of the attachment from the ground, which is prescribed as the set value, and which is manufacturable economically.

This objective is solved according to the invention by the features of the $1^{st}$ claim, in which the features are listed in the subclaims, which further develop this solution in an advantageous manner.

Through the attachment of the feeder device to the harvesting machine by means of powerful hydraulic cylinders so that its height can be altered, it is possible to tilt this, together with the attachment fixed to the front, through a relatively large range, which is used superficially for adjusting the starting position of the attachment for proper use and raising it to a transport position. Because of the size of this hydraulic cylinder and the flow of large quantities of hydraulic oil associated with it this movement takes quite a long time. Therefore for the purpose of longitudinal copying on the ground, the attachment is fixed to the feeder device so that it can tilt on an axle aligned transversely to the direction of travel of travel of the harvesting machine, so that it can move relative to the fixed feeder device about a defined angle of tilt. For monitoring the defined range for the angle of tilt, a sensor is arranged in a fixed position on the feeder device, which is in contact with the attachment. For the enforced movement of the attachment within the defined range, according to the invention between it and the feeder device a relatively smaller, and hence fast reacting hydraulic working cylinder, is envisaged.

On the attachment there is at feast one further sensor, which constantly measures the distance of the attachment from the ground. Both sensors furnish electrical signals, which are passed on to a controller, which can influence the hydraulic system of the hydraulic cylinder beneath feeder device and that of the hydraulic working cylinder between the feeder device and the front attachment.

A more expedient embodiment of the device for ground copying in accordance with the invention consists in that the distance of the attachment from the ground is determined by feelers sliding along the ground and which are moveable as regards height relative to the attachment, which transmit their height movement proportionally to so-called angular sensors for producing an appropriate output voltage. In the case of the use of a cutter as an attachment, it is suggested to use as a feeler just the stem divider located in the region of the sidewalls plainly front of the cutter bar.

In a further advantageous embodiment of the invention it has proved its worth, to suspend the attachment on the feeder device so as to be capable additionally of tilting about an axis pointing in the direction of travel of the harvesting machine for the purpose of transverse copying. A further hydraulic cylinder arranged accordingly between the feeder device and the attachment is likewise connected to the controller, which for its operation utilizes the signals from the sensors for measuring the distance.

The method of functioning of the device for ground copying begins thus, in that a preselection of the mode of operation of the attachment is made through an operating element located in the driver's cab of the harvesting machine, in which the pushbutton for "ground copying" is pressed. Thus the controller designed as a software controller for executing the necessary control and computing operations for ground copying is activated. Then a set-value transmitter is adjusted to the desired set distance of the attachment from the ground, which is conveyed to the controller via its input lead. Also the left and right hand sensors in the stem divider, which continually determine the actual distance of the attachment from the ground, deliver their values and the sensor for monitoring the defined range for the angle of tilt likewise delivers its value to the controller via separate input leads.

As long as the front attachment is in the transport position or is on the way to its starting position for field use, the two actual distances are greater than the set-value for distance and the controller lowers the feeder device together with the attachment in the direction of the ground. Previously or simultaneously via the hydraulic working cylinder it sets the attachment to the mean value of the defined range for the angle of tilt, the attainment of which is signaled by the sensor between the feeder device and the attachment. Incidentally, so that the attachment when longitudinal copying can follow all ordinarily large bumps and dips in the ground within the defined range for the angle of tilt, it has proved expedient to permit for this about a 10-degree range of freedom. The starting position of the attachment for field use is then reached, if the two actual distances or the average value for actual distance calculated by the controller agree with the set-value for distance, and hydraulic cylinders thereupon stop the lowering movement of the feeder device.

The longitudinal copying in field use over above averagely large bumps and dips in the ground is executed by the hydraulic working cylinder alone, as long as the angle of tilt lies within its defined range. For this the controller compares the mean actual distance of the attachment from the ground and accordingly controls magnitude of the deviation of the hydraulic working cylinder to a length for immediate readjustment to the set distance. If the attachment encounters above averagely large bumps and depressions in the ground, the angle of tilt attains the upper or lower limit of the defined range. This is reported by the sensor for monitoring the angle of tilt to the controller, which thereupon raises or lowers the feeder device via its hydraulic cylinders so far, until the angle of tilt is again within its defined range. At the same time they hydraulic working cylinder likewise via the control signals from the controller takes care of adherence to the set-value for distance.

In a further preferred variant embodiment of the invention, the longitudinal copying according to the invention is advantageously combined with simultaneous transverse copying, in which the controller transmits to the hydraulic cylinder a control signal from the difference in the actual distance, which tilts the attachment about an axis which points along the direction of travel of the harvesting machine.

To sum up, the advantages of the invention are that with it very rapid ground copying has become possible for the front attachment of a harvesting machine, which shows itself particularly at high traveling speeds of the harvesting machine. The sensors which measure the distance of the attachment from the ground in the embodiment of mechanical feelers in conjunction with angular sensors delivering electrical signals furnish the most precise values, so that the attachment can follow the ground contour exactly. Finally, for this device for ground copying only simple components, which are already present on harvesting machines, are necessary so that their costs of manufacture are kept within limits.

BRIEF DESCRIPTION OF THE DRAWINGS

The invention will now be explained in more detail using one example of its embodiment, in which the individual figures show.

DETAILED DESCRIPTION OF THE PREFERRED EMBODIMENT

Figure 1:
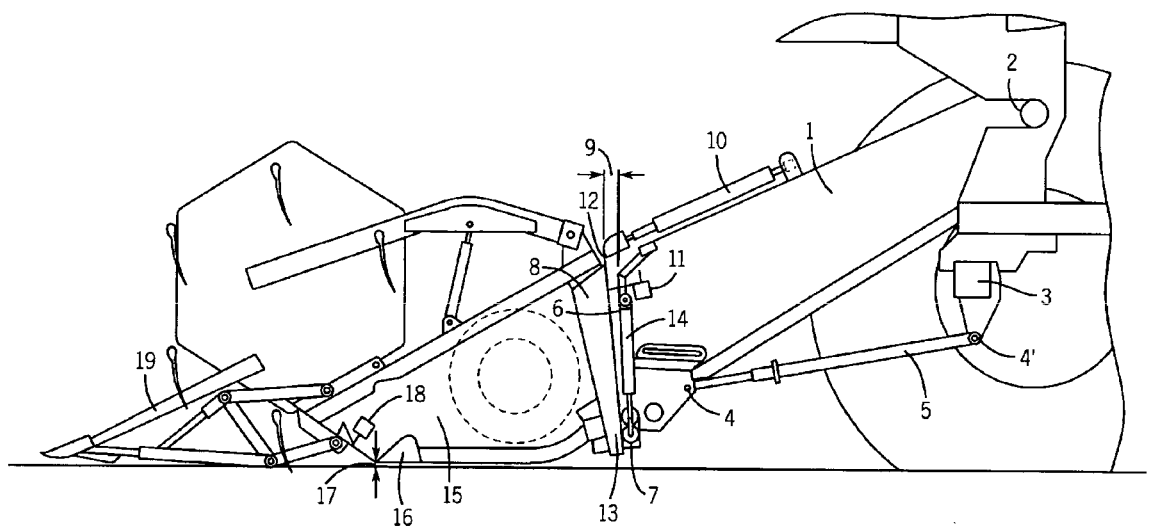
FIG. 1 is a side view of the front part of a schematically depicted combine harvester with a feeder shaft and cutter.
Figure 2:
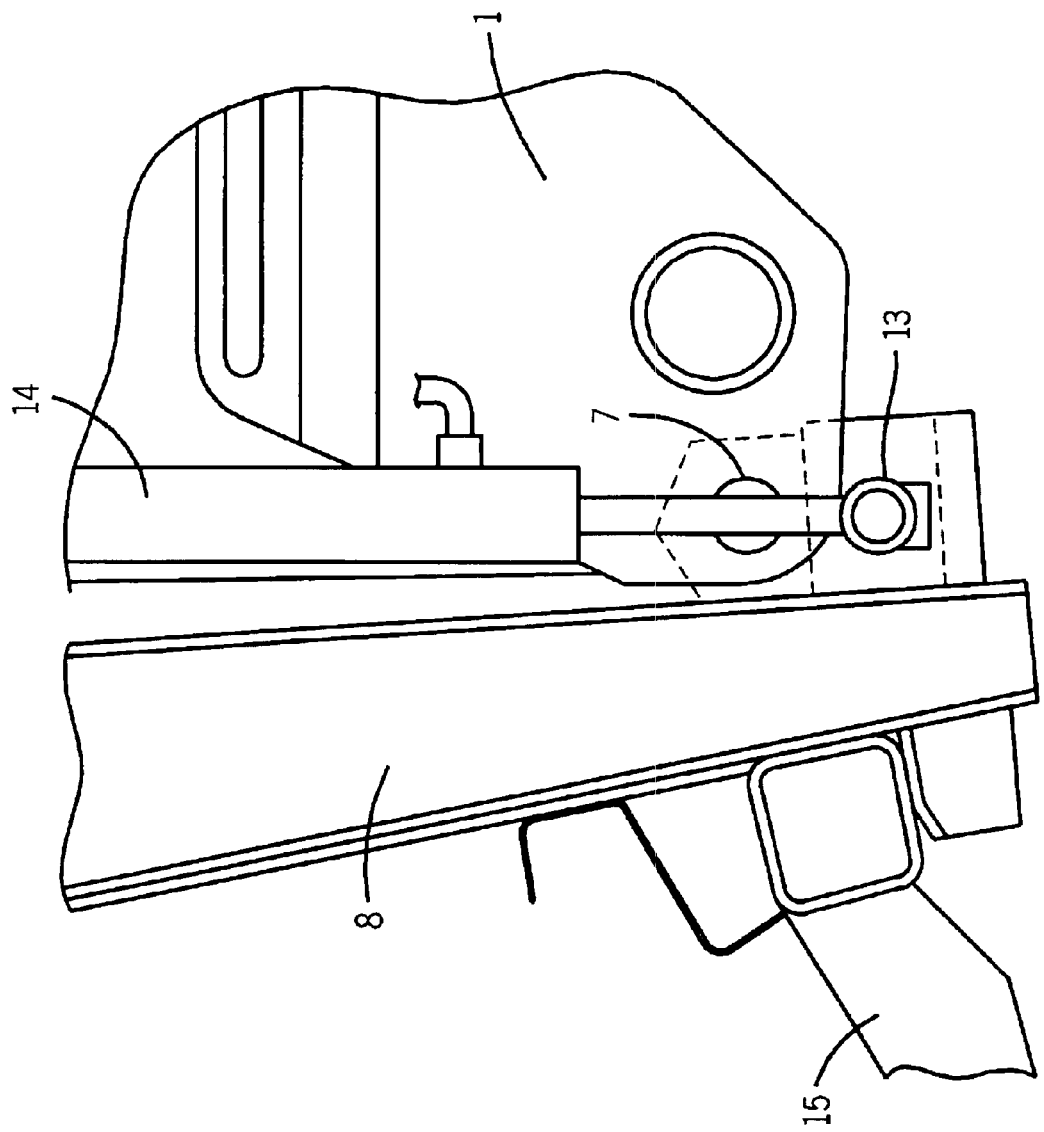
FIG. 2 is an enlarged section of the lower part of the tilting frame from FIG. 1.

In FIGS. 1 and 2 the device for ground copying is realized with an example of a combine harvester, which possesses a feeder shaft as a feeder device 1 for the material to be threshed, which is fixed on the chassis 3 around its upper shaft axle 2 so that it can be tilted to adjust its height. For this there are between the chassis 3 and the under side of the feeder shaft two hydraulic cylinders 5 fixed one on each side which act on it through articulated joints 4 and 4'. At the front the feeder shaft is equipped with reinforcing frames 6, on the under side of which there is an axle 7 which runs transversely to the direction of travel of the combine harvester. Around this axle 7 is arranged a tilting frame 8 opposite the reinforcing frame 6 so that it can tilt through a defined angle of tilt 9. A hydraulic working cylinder 10, which is joined with articulated joints at one end to the upper side of the feeder shaft and at the other end to the tilting frame 8 forms the connection, which changes the distance between them. A sensor 11 attached to the side of the feeder shaft with its feeler arm 12 touching the tilting frame 8 constantly records the magnitude of the angle of tilt 9.

Besides the tilting frame 8 is suspended opposite the reinforcing frame 6 so that it can tilt about an axle 13 pointing in the direction of travel of the combine harvester, for which between the feeder shaft and the tilting frame 8 a hydraulic cylinder 14 with articulated joints is arranged vertically on the left side viewed in the direction of travel.

The tilting frame 8 is designed so that it can rapidly pick up a front attachment 15 for the harvesting machine and deposit again on the ground or a transport lorry, which in this example is a cutter. When ground copying, its cutter bar 16 exhibits a distance 17 from the ground, which is measured constantly on both sides of the attachment 15 with a sensor 18 on each side. The sensors 18 which are designed as angular sensors are coupled for this with the stem dividers 19 of the attachment 15, which are adjustable in height and slide on the ground, are coupled in such a manner that their movement in height is transferable proportionally to the tilting movement of the sensors 18.

Figure 3:
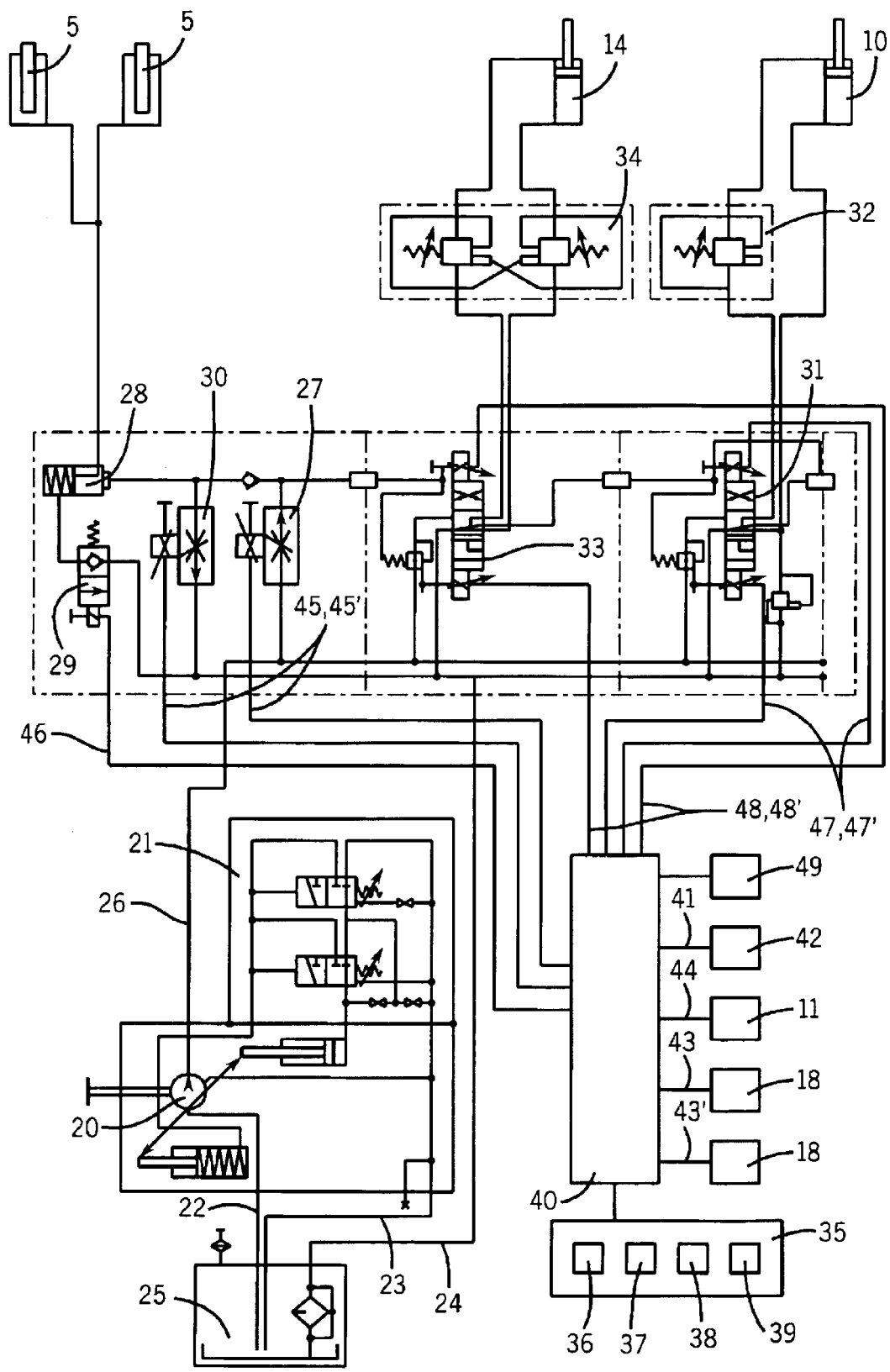
FIG. 3 is an electrical/hydraulic circuit diagram of the device for ground copying.

The electrical/hydraulic circuit diagram of FIG. 3 conveys an overview of all the control and operating elements necessary for ground copying and of their interaction in the circuit. For this the harvesting machine is equipped at a suitable place with a hydraulic variable displacement pump 20, which is connected with a hydraulic positioning device 21. Its suction pipe 22 and overflow oil pipe 23 and the return flow pipe 24 of the entire hydraulic system end together in the hydraulic oil reservoir 25. Its pressure pipe 26 is connected on the one hand via a current regulator for lifting 27 and a logic element 28 with the hydraulic cylinders 5 beneath the feeder shaft. On the other hand there is a connection between the hydraulic cylinders 5 and the return flow pipe 24 via the logic element 28 and an electrical shut-off valve 29 as well as a current controller for lowering 30.

On the other hand, the pressure pipe 26 is connected via a 4/3-way proportional valve 31 and a simple lowering brake valve 32 with the hydraulic working cylinder 10 for longitudinal copying and in addition via another 4/3-way proportional valve 33 and a double lowering brake valve 34 with the hydraulic cylinder for transverse copying.

To the electrical part of ground copying belongs an operating unit 35 for preselecting the options for employment of the attachment 15, for which a pushbutton 36 for manual control, a pushbutton 37 for high cutting, a pushbutton 38 for regulation of supporting pressure and finally a pushbutton 39 for ground copying of the attachment 15 are available. The operating unit 35 is connected with a controller 40, which is designed as a software controller for executing control and computing operations. It gets via an input lead 41 from a set value transmitter 42 the default value for a set distance measure 17 for the attachment 15 from the ground, via the input leads 43;43' the actual distance 17 from the sensors 18 and via input lead 44 from sensor 11 the actual value for the angle of tilt 9. For outputting its control signals it possesses output leads 45;45' leading to the current regulator for raising 27 and to the current regulator for lowering 30 respectively, for the hydraulic cylinder 5, an output lead to the electrical shut-off valve 29, output leads 47;47' to the 4/3-way proportional valve 31 for the hydraulic working cylinder 10 and output leads 48;48' to the 4/3-way proportional valve 33 for the hydraulic cylinder 14.

Furthermore, the controller 40 is connected with a hand lever 49, from which it receives control signals for manual control of the front attachment 15.

What is claimed is:

1. In a crop harvesting machine movable along a direction of travel and having a crop feeder device movable through variable heights above the ground through manipulation of first hydraulic cylinders and a crop gathering attachment mounted on a front side of said crop feeder device, said crop gathering attachment including fixed height sensors for measuring a distance of the attachment above the ground, said height sensors being connected via a controller to said first hydraulic cylinders for the controlling the height of said crop feeder device and said crop gathering attachment mounted thereto, the improvement comprising:

said crop gathering attachment being mounted on a first axle carried by said crop feeder device, said first axis being arranged horizontally and transversely to the direction of travel of said crop harvesting machine so that said crop gathering attachment can title about a defined angle of tilt relative to said crop feeder device;

a second hydraulic cylinder positioned between said crop feeder device and said crop gathering attachment to control the angle of tilt of said crop gathering attachment relative to said crop feeder device with a defined range, said second hydraulic cylinder being operatively connected to said controller;

a third hydraulic cylinder operably connected between said crop gathering attachment and said crop feeder device to rotate said crop gathering attachment about a generally horizontal second axis extending in the direction of travel;

a tilt sensor for monitoring the angle of tile, said tilt sensor being connected via the controller to said first and second hydraulic cylinders to vary said angle of tilt; and the height sensors also being connected via the controller with said first and second hydraulic cylinders to vary the angle of tilt.

2. The crop harvesting machine of claim 1 wherein said tilt sensors are coupled with mechanical feelers sliding on the ground, said mechanical feelers being movable as said height of said attachment varies.

3. The crop harvesting machine of claim 2 wherein said crop gathering attachment includes a crop engaging apparatus located at a forward position on said attachment, said mechanical feelers extending forwardly of said crop engaging apparatus.

4. The crop harvesting machine of claim 3 wherein said crop engaging apparatus is a crop cutting mechanism.

5. The crop harvesting machine of claim 3 wherein said crop engaging apparatus is a crop collection device including a pick up drum, said mechanical feelers extending forwardly of said pick up drum.

6. The crop harvesting machine of claim 4 further comprising stem dividers located adjacent side walls of the cutting mechanism and extending forwardly of said cutting mechanism, said stem dividers being operatively associated with said height sensors for measuring the distance.

7. The crop harvesting machine of claim 1 wherein the defined range for the angle of tilt between the crop gathering attachment and the crop feeder device is approximately 10 degrees.

8. The crop harvesting machine of claim 1 wherein said third hydraulic cylinder is associated with said controller.

9. The crop harvesting machine of claim 8 wherein the controller is a software controller connected to a set value transmitter for defining a set distance of the crop gathering attachment above the ground, the height sensors which continuously measure the actual distance of the crop gathering attachment above the ground, and the tilt sensor for monitoring the defined range of the angle of tilt, said controller controlling the operation of the first hydraulic cylinders of the crop feeder device, to the second hydraulic cylinder between the crop feeder device and the crop gathering attachment and to the third hydraulic cylinder for rotating said crop harvesting attachment about said second.

10. The crop harvesting machine of claim 9 wherein the controller is connected with an operating unit for inputting pre-selected options relating to the operation of the crop gathering attachment, said operating unit including at least one pushbutton for manual control, a second pushbutton for high cutting operation, a third pushbutton for regulating supporting pressure in said hydraulic cylinders, and a fourth pushbutton for engaging an operation to make said crop gathering attachment follow ground contours.

11. The crop harvesting machine of claim 9 wherein the controller is provided with a hand lever for manual control of said crop gathering attachment.

12. The crop harvesting machine of claim 9 wherein said controller calculates a mean actual distance of the crop gathering attachment above the ground from the actual distances of the height sensors, said mean actual distance being a control signal for the second hydraulic cylinder for readjustment of the set distance, so long as the angle of tilt is within the defined range.

13. The crop harvesting machine of claim 12 wherein the signal from the tilt sensor monitoring the defined range of the angle of tilt becomes the control signal for the first hydraulic cylinders of the crop feeder device for readjusting into the defined range with simultaneous adherence to the set distance for the crop gathering attachment above the ground when said angle of tilt attains or exceeds the upper or lower limits of said defined range.

14. The crop harvesting machine of claim 13 wherein, for setting an initial position of the crop gathering attachment for ground copying, the signal from the tilt sensor monitoring the defined range for the angle of tilt is the control signal for the second hydraulic cylinder for readjusting the angle of tilt to a mean value, and the mean actual distance of the crop gathering attachment from the ground calculated by the controller is the control signal for the first hydraulic cylinders for the feeder device for setting it to the set distance.

15. The crop harvesting machine of claim 14 wherein the difference from actual distance of the crop gathering attachment above the ground is the control signal for the third hydraulic cylinder which tilts the attachment about the second axis pointing in the direction of travel.

16. The crop harvesting machine of claim 9 wherein the height sensors for distance and the tilt sensor for monitoring the defined range for the angle of tilt are formed as angular sensors.

* * * * *

UNITED STATES PATENT AND TRADEMARK OFFICE
CERTIFICATE OF CORRECTION

PATENT NO. : 6,813,873 B2  Page 1 of 1
APPLICATION NO. : 10/220968
DATED : November 9, 2004
INVENTOR(S) : Wilheim von Allworden et al.

It is certified that error appears in the above-identified patent and that said Letters Patent is hereby corrected as shown below:

Column 7
Line 5, "title" should read - tilt

Signed and Sealed this

Eleventh Day of May, 2010

David J. Kappos
*Director of the United States Patent and Trademark Office*